United States Patent
Narita et al.

(10) Patent No.: US 10,805,481 B2
(45) Date of Patent: Oct. 13, 2020

(54) IMAGE PROCESSING APPARATUS RECEIVING SETTING VALUES FOR SCAN PROCESS AND OUTPUTTING SCAN DATA

(71) Applicant: BROTHER KOGYO KABUSHIKI KAISHA, Nagoya, Aichi (JP)

(72) Inventors: Kenju Narita, Nagoya (JP); Kenji Tamaki, Ichinomiya (JP); Nobuyuki Kamiya, Anjo (JP); Hiroya Nojiri, Nagoya (JP); Lei Li, Ichinomiya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/261,964

(22) Filed: Jan. 30, 2019

(65) Prior Publication Data

US 2019/0253571 A1  Aug. 15, 2019

(30) Foreign Application Priority Data

Feb. 14, 2018   (JP) ................. 2018-023825

(51) Int. Cl.
| | |
|---|---|
| *H04N 1/00* | (2006.01) |
| *H04N 1/387* | (2006.01) |
| *H04N 1/40* | (2006.01) |
| *H04N 1/393* | (2006.01) |

(52) U.S. Cl.
CPC ....... *H04N 1/00331* (2013.01); *H04N 1/3877* (2013.01); *H04N 1/3935* (2013.01); *H04N 1/40087* (2013.01)

(58) Field of Classification Search
CPC ............ H04N 1/00331; H04N 1/3877; H04N 1/3935; H04N 1/40087

USPC .......... 358/451, 448, 1.9, 2.1, 462
See application file for complete search history.

(56) References Cited

U.S. PATENT DOCUMENTS

| | | | | |
|---|---|---|---|---|
| 2005/0213120 A1* | 9/2005 | Ohkawa | ........... | G06T 3/4007 358/1.9 |
| 2009/0303506 A1* | 12/2009 | Ikegawa | ........... | H04N 1/6094 358/1.9 |

FOREIGN PATENT DOCUMENTS

JP        2000-022945 A      1/2000

* cited by examiner

*Primary Examiner* — Quang N Vo
(74) *Attorney, Agent, or Firm* — Scully Scott Murphy and Presser (57) ABSTRACT

In an image processing apparatus, in a case where setting values indicate to create scan data by using digital halftoning and requires execution of a prescribed process using a result of character recognition, a controller outputs an instruction to create multiple-value scan data having a pixel value represented by two or more bits. The controller executes the character recognition on the multiple-value scan data. The controller converts the multiple-value scan data into converted scan data by using digital halftoning, and executes the prescribed process on the converted scan data. In a case where the setting values indicate to create scan data by using a method different from the digital halftoning, and requires execution of the prescribed process, the controller outputs an instruction to create setting-based scan data. The controller executes the character recognition on the setting-based scan data. The controller executes the prescribed process on the setting-based scan data.

5 Claims, 10 Drawing Sheets

IMAGE PROCESSING APPARATUS RECEIVING SETTING VALUES FOR SCAN PROCESS AND OUTPUTTING SCAN DATA

CROSS REFERENCE TO RELATED APPLICATION

This application claims priority from Japanese Patent Application No. 2018-023825 filed Feb. 14, 2018. The entire content of the priority application is incorporated herein by reference.

TECHNICAL FIELD

The present disclosure relates to a computer readable program by a computer in an image processing apparatus configured to perform character recognition.

BACKGROUND

There is a known technology for performing a character recognition process on scan data. In the conventional technology, a preliminary scan to improve the accuracy of character recognition. The character recognition process is performed on the scan data read from the preliminary scan. After the preliminary scan is performed, a main scan is performed, an image process is performed on the scan data read in the main scan, and the processed scan data is output.

SUMMARY

However, execution of the preliminary scan reduces the efficiency in the above described technology. In view of the foregoing, it is an object of the disclosure to provide a technology for efficiently performing a character recognition process.

In order to attain the above and other objects, the disclosure provides a non-transitory computer readable storage medium storing a set of program instructions for an image processing apparatus including a controller, an operation interface, and a memory. The set of program instructions includes: receiving setting values for a scan process via the operation interface; in a first case where the setting values indicate to create scan data representing an image by using digital halftoning to represent gradations and indicate to require execution of a prescribed process using a result of a character recognition process: outputting a first scan instruction to create multiple-value scan data by scanning an original, the multiple-value scan data having a plurality of pixel values, each of the plurality of pixel values being represented by two or more bits for representing color; storing the multiple-value scan data which is acquired as a response to the first scan instruction; executing the character recognition process on the multiple-value scan data; after the character recognition process is performed, executing a convert process to convert the multiple-value scan data into converted scan data representing gradations in the image by using digital halftoning; executing the prescribed process on the converted scan data to generate first executed scan data by using the result of the character recognition process; and outputting the first executed scan data; and in a second case where the setting values indicate to create scan data representing an image by using a method different from the digital halftoning to represent gradations, and indicate to require execution of the prescribed process: outputting a second scan instruction to create setting-based scan data matching the setting values by scanning the original; storing the setting-based scan data which is acquired as a response to the second scan instruction; executing the character recognition process on the setting-based scan data; executing the prescribed process on the setting-based scan data to generate second executed scan data by using the result of the character recognition process; and outputting the second executed scan data.

According to another aspect, the disclosure provides a non-transitory computer readable storage medium storing a set of program instructions for an image processing apparatus including a controller, an operation interface, and a memory. The set of program instructions includes: receiving setting values for a scan process via the operation interface; in a case where the setting values indicate to create scan data at a first resolution lower than a prescribed resolution and indicate to require execution of a prescribed process using a result of a character recognition process: outputting a first scan instruction to create high-resolution scan data at a high resolution higher than the first resolution by scanning an original; storing the high-resolution scan data which is acquired as a response to the first scan instruction; executing the character recognition process on the high-resolution scan data; after the character recognition process is performed, executing a convert process to convert the high-resolution scan data into low-resolution scan data at the first resolution; executing the prescribed process on the low-resolution scan data to generate first executed scan data by using the result of the character recognition process; and outputting the first executed scan data; and in a case where the setting values indicate to create scan data at a second resolution higher than or equal to the prescribed resolution and indicate to require execution of the prescribed process: outputting a second scan instruction to create setting-based scan data at the second resolution by scanning the original; storing the setting-based scan data which is acquired as a response to the second scan instruction; executing the character recognition process on the setting-based scan data; executing the prescribed process on the setting-based scan data to generate second executed scan data by using the result of the character recognition process; and outputting the second executed scan data.

According to still another aspect, the disclosure provides an image processing apparatus. The image processing apparatus includes: an operation interface; a memory; and a controller configured to perform: receiving setting values for a scan process via the operation interface; in a first case where the setting values indicate to create scan data representing an image by using digital halftoning to represent gradations and indicate to require execution of a prescribed process using a result of a character recognition process: outputting a first scan instruction to create multiple-value scan data by scanning an original, the multiple-value scan data having a plurality of pixel values, each of the plurality of pixel values being represented by two or more bits for representing color; storing the multiple-value scan data which is acquired as a response to the first scan instruction; executing the character recognition process on the multiple-value scan data; after the character recognition process is performed, executing a convert process to convert the multiple-value scan data into converted scan data representing gradations in the image by using digital halftoning; executing the prescribed process on the converted scan data to generate first executed scan data by using the result of the character recognition process; and outputting the first executed scan data; and in a second case where the setting values indicate to create scan data representing an image by using a method different from the digital halftoning to represent gradations, and indicate to require execution of the prescribed process: outputting a second scan instruction to create setting-based scan data matching the setting values by scanning the original; storing the setting-based scan data which is acquired as a response to the second scan instruction; executing the character recognition process on the setting-based scan data; executing the prescribed process on the setting-based scan data to generate second executed scan data by using the result of the character recognition process; and outputting the second executed scan data.

According to still another aspect, the disclosure provides an image processing apparatus. The image processing apparatus includes: an operation interface; a memory; and a controller configured to perform: receiving setting values for a scan process via the operation interface; in a case where the setting values indicate to create scan data at a first resolution lower than a prescribed resolution and indicate to require execution of a prescribed process using a result of a character recognition process: outputting a first scan instruction to create high-resolution scan data at a high resolution higher than the first resolution by scanning an original; storing the high-resolution scan data which is acquired as a response to the first scan instruction; executing the character recognition process on the high-resolution scan data; after the character recognition process is performed, executing a convert process to convert the high-resolution scan data into low-resolution scan data at the first resolution; executing the prescribed process on the low-resolution scan data to generate first executed scan data by using the result of the character recognition process; and outputting the first executed scan data; in a case where the setting values indicate to create scan data at a second resolution higher than or equal to the prescribed resolution and indicate to require execution of the prescribed process: outputting a second scan instruction to create setting-based scan data at the second resolution by scanning the original; storing the setting-based scan data which is acquired as a response to the second scan instruction; executing the character recognition process on the setting-based scan data; executing the prescribed process on the setting-based scan data to generate second executed scan data by using the result of the character recognition process; and outputting the second executed scan data.

BRIEF DESCRIPTION OF THE DRAWINGS

The particular features and advantages of the disclosure as well as other objects will become apparent from the following description taken in connection with the accompanying drawings, in which.

DETAILED DESCRIPTION

<Configuration of a Scanning System>

Figure 1:
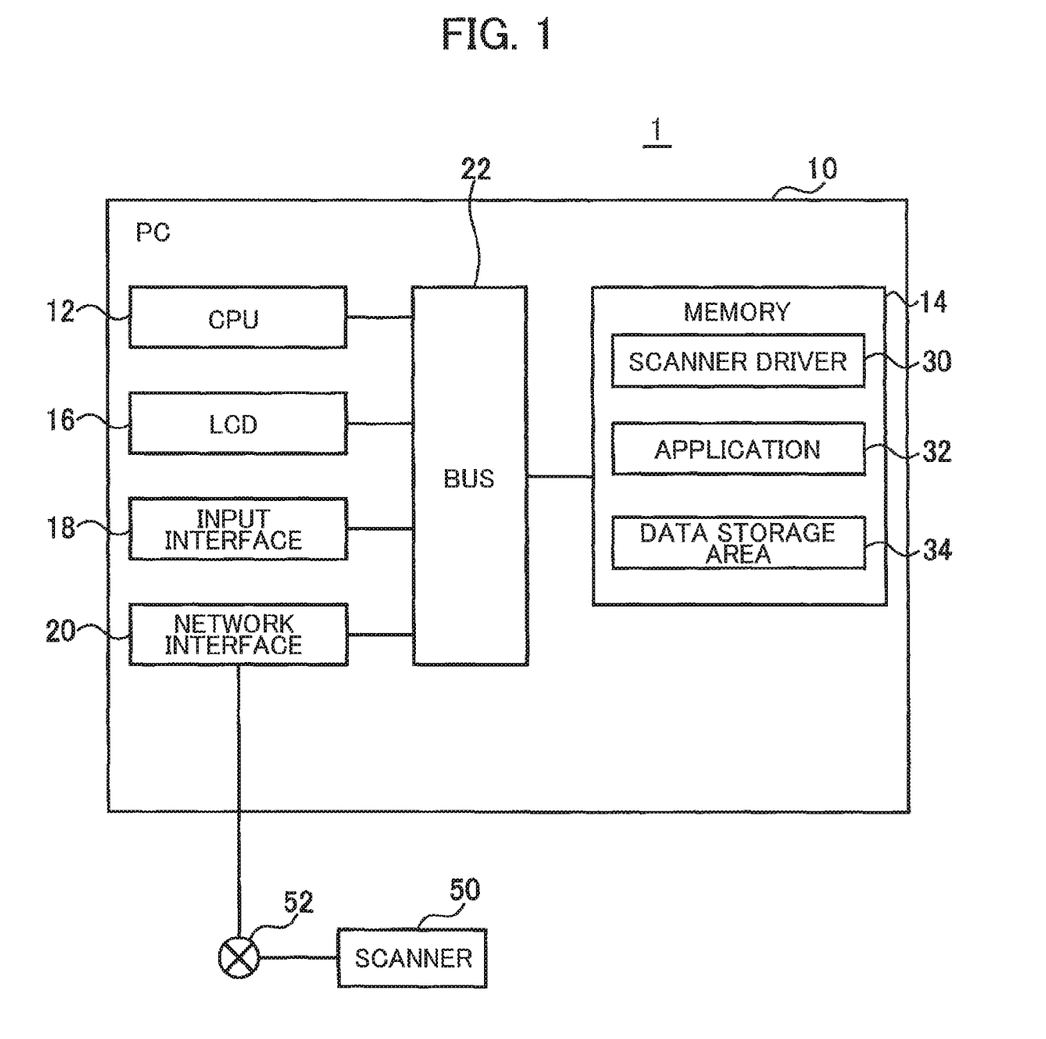
FIG. 1 is a block diagram illustrating a scanning system according to a first embodiment.

FIG. 1 shows a block diagram of a scanning system 1 according to an embodiment of the present disclosure. The scanning system 1 includes a PC 10 (an example of an image processing apparatus) and a scanner 50.

The PC 10 mainly includes a CPU 12 (an example of a computer and a processor), a memory 14, an LCD 16, an input interface 18 (an example of a user interface), and a network interface 20 which can communicate with each other via a bus 22.

The PC 10 can communicate with the scanner 50 via the network interface 20 and a network 52. A communication method that can be used may be a wired LAN, USB, Wi-Fi (registered trademark), and Bluetooth (registered trademark). The scanner 50 sends and receives various types of information and instructions to and from the PC 10, and creates scan data on the basis of control by the PC 10.

The CPU 12 performs processes according to a scanner driver 30 (an example of a control program) or an application 32 in the memory 14 (described later). The scanner driver 30 is a device driver for the scanner 50, and controls the operation of the scanner 50. An example of the application 32 is a program to perform image processes on scan data created by the scanner 50. A specific type of application is image editing software such as Adobe Photoshop (registered trademark). The scanner driver 30 and the application 32 may be TWAIN-compliant programs.

In the following description, the CPU 12 executing the scanner driver 30 may be described simply using the name of the program. As an example, the phrase "the scanner driver 30" may mean "the CPU executing the scanner driver 30."

The memory 14 includes a data storage area 34 (an example of a storage area). The memory 14 stores the scanner driver 30 and the application 32. The data storage area 34 is an area that stores data needed to execute the scanner driver 30. The memory 14 may be any combination of RAM, ROM, flash memory, a hard drive, and a buffer in the CPU 12.

The memory 14 may be computer readable storage media. The computer readable storage media are non-transitory media. In addition to the aforementioned examples, the non-transitory media include recording media such as a CD-ROM or a DVD-ROM. The non-transitory media are tangible media. In contrast, electrical signals that transfer a program being downloaded from a server on the Internet are signals that can be read by a computer, so the signals are a type of media that can be read by a computer, but the signals are not the non-transitory computer readable storage media.

An LCD 16 displays the various functions of the PC 10. An input interface 18 is for receiving input by a user. The input interface 18 includes a keyboard and a mouse.

<Operation of a Scanning System>

The operation of a scanning system 1 as described herein essentially refers to process by the CPU 12 in accordance with written instructions in a program. In other words, processes such as "determining," "extracting," "selecting," "calculating," "deciding," "specifying," "acquiring," "receiving," "controlling," and "setting" in the following description indicate processes of the CPU 12. Process by the CPU 12 includes hardware control via an OS 36. "Acquiring" is used as a concept which does not necessarily require a request. In other words, the process by which the CPU 12 receives data without requesting is included in the concept of "the CPU 12 acquires data." "Data" as described herein refer to bit strings that can be read by a computer. Data of different formats are treated as the same data when the content of the data is essentially the same. The same holds true for "information" in this specification. An "instruction," a "response," or a "request" is processed by communicating information indicated in the "instruction," the "response," or the "request." The terms "instruction," "response," and "request" may also be used to describe information indicating an "instruction," a "response," or a "request."

In the scanning system 1, scanning settings are usually input to the PC 10 via the input interface 18. The PC 10 sends to the scanner 50 a scan instruction to perform a scan process to scan an original on the basis of the entered settings. As a result, the scan process is performed by the scanner 50 on the basis of the user's requirement. Here, the scanning settings include setting for the size of the original, setting for a scale of color for scan data, setting for a resolution of scan data, setting for an automatic correction of the orientation of the original, and setting for side of the original to be scanned.

The setting for the size of the original includes a value specifying the size of the original which is a target of processes, that is, the size of a typical sheet of paper, such as A3 or A4. The setting for the scale of color for the scan data includes number of colors (number of (gray) levels, or gradations) that can be set for each pixel in bitmap image data, that is, a 24-bit color-scale (166,777,216 colors) (hereinafter, referred to as the color-scale), an 8-bit grayscale (256 colors) (hereinafter, referred to as the grayscale), and a 1-bit monochrome scale (2 colors: white and black) (hereinafter, referred to as the monochrome scale). In other words, the scale of color indicates color depth that can be set for each pixel in bitmap image data. The color depth is the number of bits used to indicate the color of a single pixel in a bitmapped image for representing color of the image. That is, the bit number in name of the color-scale, such as "24" in the 24-bit color-scale and "8" in the 8-bit color-scale, indicates number of bits per pixel (bpp) for representing the color depth. The setting for the scale of color includes a digital-halftoning scale in which gradation (half tone or gray level) is represented by only 2 colors (white and black), and digital halftoning is used to simulate shades of gray by controlling the number of pixels and patterns or densities of pixels. In this embodiment, an error diffusion (ED) method is used as the digital halftoning (hereinafter, this digital-halftoning scale using the ED method is referred to as the "ED scale"). The digital halftoning method may be one of other methods such as dithering and the density pattern method. Hereinafter, scan data whose gradation (half tone, gray level, or color) is represented in a specific scale is referred to as "the scan data in the specific scale". For example, the scan data whose color is represented in the color-scale is referred to as the scan data in the color-scale.

The setting for the resolution of scan data is a value specifying reading accuracy during scanning, such as 300 dpi and 500 dpi. The setting for the automatic correction process of the orientation of an image in scan data D1 is a value having either one of ON and OFF that specifies whether or not to perform an automatic correction process of image orientation based on the scan data D1 (hereinafter referred to as "automatic correction process") generated by reading an original. The automatic correction process is performed for correcting an orientation of the image. The orientation is specified by an optical character recognition (OCR) process on the scan data D1. The automatic correction process corrects the orientation of the image to be right side up on the basis of the specified orientation of the image. The setting for side of the original to be scanned includes a value having either one of a double-side scan or a single-side scan that species whether to scan both sides of the original or to scan only one side of the original.

When various settings are input via the input interface 18 according to the user's operations, the scanner driver 30 accepts the entered settings and sends a scan instruction to the scanner 50 based on the accepted settings. There may be cases where the automatic correction process cannot be properly performed when the scan process is performed in some settings (described later).

Figure 2:
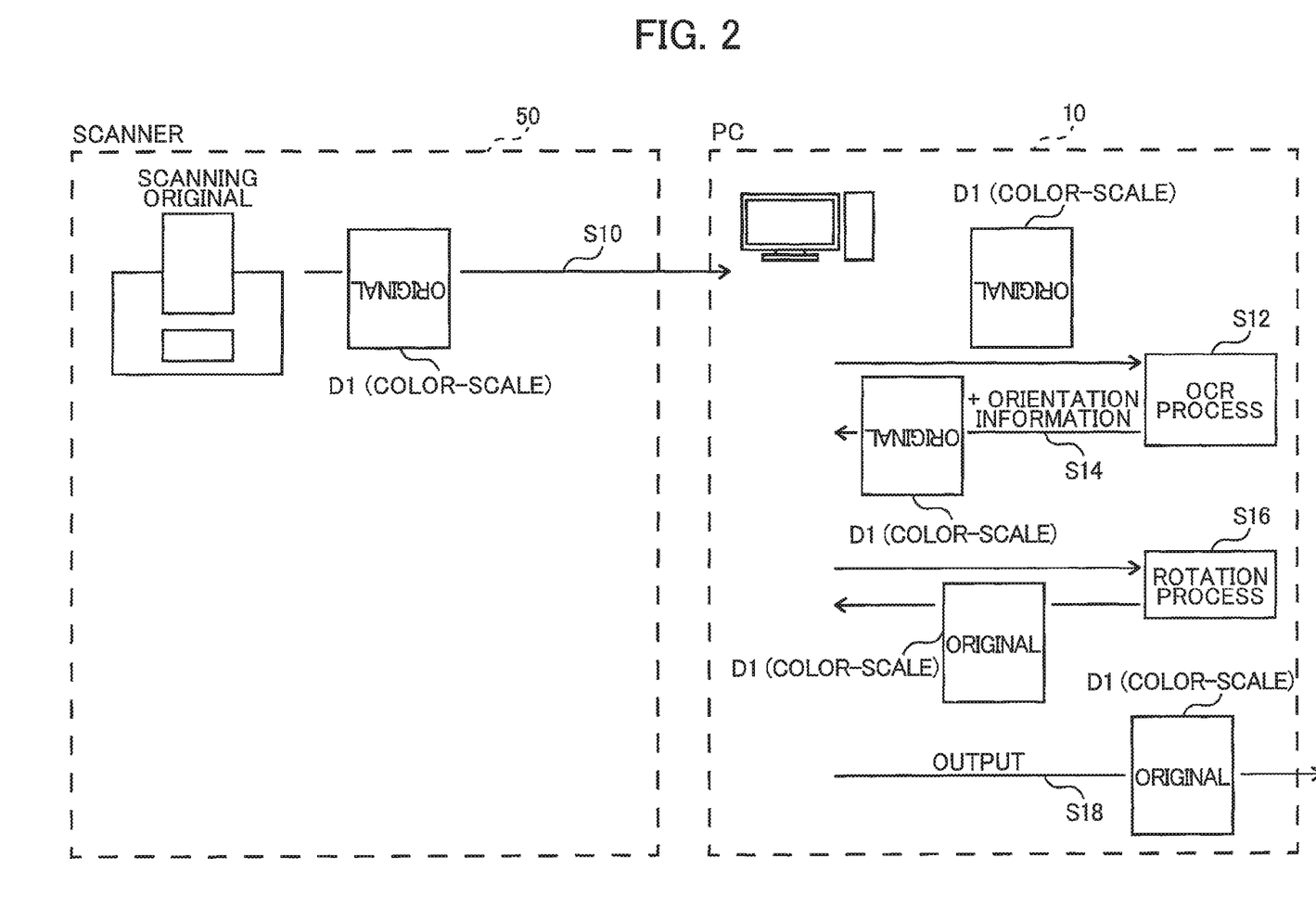
FIG. 2 is an explanatory diagram illustrating a process executed by the scanning system when a scale of color is set to a color-scale according to the first embodiment.

FIG. 2 shows an example when the setting for the scale of color is set to the color-scale based on user settings (or user's operations), and the setting for the automatic correction process is set to ON. In this case, when these settings are set based on the user operations, the scanner driver 30 sends to the scanner 50 a scan instruction to perform a scan process based on the color-scale. As a result, the scanner 50 performs the scan process based on the color-scale to create scan data D1 in the color-scale. In S10, the scanner 50 sends the created scan data D1 to the PC 10.

FIG. 2 shows an image (or the text "ORIGINAL") of the original represented by the scan data D1 in an upside down state to indicate that the image is rotated 180° from the right side up state. Here, the scan data D1 is created by the scanner 50. FIG. 2 indicates that the original is placed in an upside down state in which the original is rotated 180° from the right side up state when the original is scanned. In other words, the scanner 50 sends to the PC 10 the scan data D1 representing an image of an original in the upside down state. When the scanner driver 30 receives the scan data D1, the scanner driver 30 stores the scan data D1 in the data storage area 34.

In S12, the scanner driver 30 performs the OCR process on the scan data D1. The OCR process generates a histogram of the image, and binarizes image data based on the generated histogram to recognize text included in the image represented by the binarized image data. Accordingly, the orientation of text included in an image represented by the scan data D1 can be detected by the OCR. In S14, on the basis of a result of the OCR process, the scanner driver 30 acquires information on the orientation of text (hereinafter, referred to as "orientation information") included in an image represented by the scan data D1. The OCR process is an existing technology, so further details are omitted.

In S12, the OCR process is performed on the scan data D1 in the color-scale. Because the color of each pixel in the scan data D1 in the color-scale is distinguished properly, the OCR process is performed on the scan data D1 in the color-scale in a high accuracy. In other words, the scanner driver 30 can properly acquire orientation information based on the scan data D1 in the color-scale. Note that the color of each pixel in the scan data D1 is distinguished properly when the scan data D1 is in the grayscale or the monochromatic scale without the digital halftoning as well as in the color-scale, so the scanner driver 30 performs the OCR process and can acquire orientation information in a high accuracy. This is because a boundary between a text image and a background image can be distinguished properly in the scan data D1 in the monochromatic scale without the digital halftoning.

When the orientation information is acquired, in S16 the scanner driver 30 rotates an image in the scan data using the acquired orientation information. When the orientation information indicates that text included in an image in the scan data is rotated 180° from the right side up state, the scanner driver 30 rotates the image in the scan data 180° so that the rotated image is in the right side up state. In S18, the scanner driver 30 outputs the scan data representing an image in the right side up state to the application 32. Accordingly, the application 32 can perform processes such as an editing process on a correctly oriented image.

Figure 3:
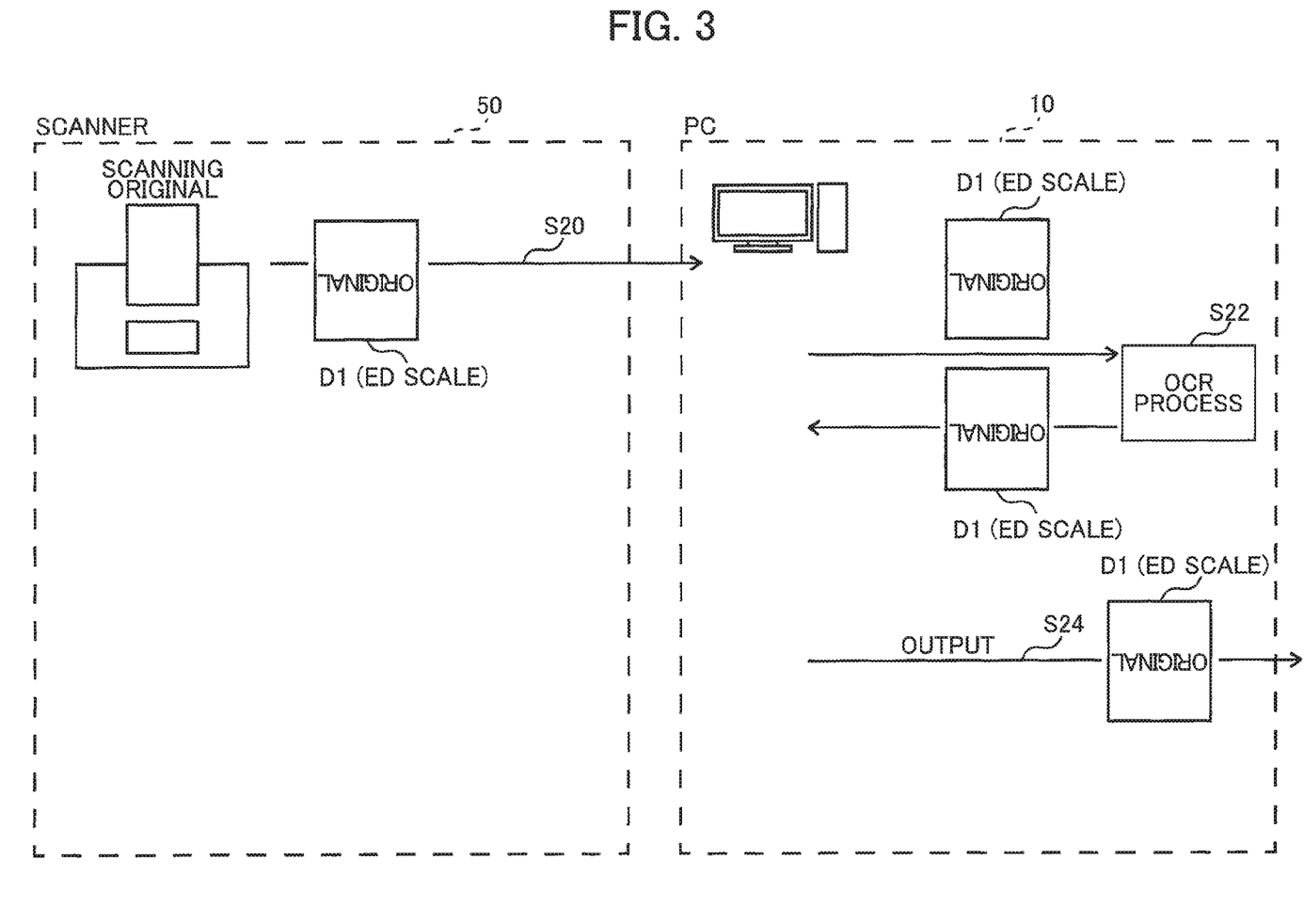
FIG. 3 is an explanatory diagram illustrating a process executed by the scanning system when a scale of color is set to an ED scale according to the first embodiment.

FIG. 3 shows a conceivable case based on the settings set by the user including the setting for the scale of color set to the ED scale and the setting for the automatic correction process set to ON. In the conceivable case, when the user sets the above described settings, the scanner driver 30 sends to the scanner 50 a scan instruction to perform a scan process based on the ED scale. Accordingly, the scanner 50 performs the scan process based on the ED scale to create scan data D1 in the ED scale. In S20, the scanner 50 sends the created scan data D1 to the PC 10.

The scanner driver 30 receives the scan data D1 and stores the scan data D1 in the data storage area 34. In S22 the scanner driver 30 performs the OCR process based on the scan data D1. Here, in S22 the OCR process is performed on the scan data D1 whose scale of the color is in the ED scale. An image represented by the scan data D1 in the ED scale expresses shades of gray by adjusting the number of pixels and patterns and densities of pixels. Accordingly, the color tone of each pixel is difficult to recognize, and the OCR process cannot be suitably performed on the scan data based on the ED scale. Thus, the scanner driver 30 is unable to acquire orientation information and cannot rotate the image in the scan data to be in the right side up state. Accordingly, in S24 the scanner driver 30 outputs to the application 32 the scan data which has not been rotated to be in the right side up state, that is, the scan data in the upside down state.

On the other hand, in the present embodiment, when the user sets the setting for the scale of color to the ED scale and the setting for the automatic correction process to ON, the scanner driver 30 sends to the scanner 50 a scan instruction to perform a scan process based on the grayscale for creating scan data D1 in the grayscale, in spite of the ED scale that the user sets as a scale of the color for the scan process. Accordingly, in S30 shown in FIG. 4 the scanner 50 performs the scan process based on the grayscale to create the scan data D1 in the grayscale. The scanner 50 then sends the created scan data D1 to the PC 10.

Figure 4:
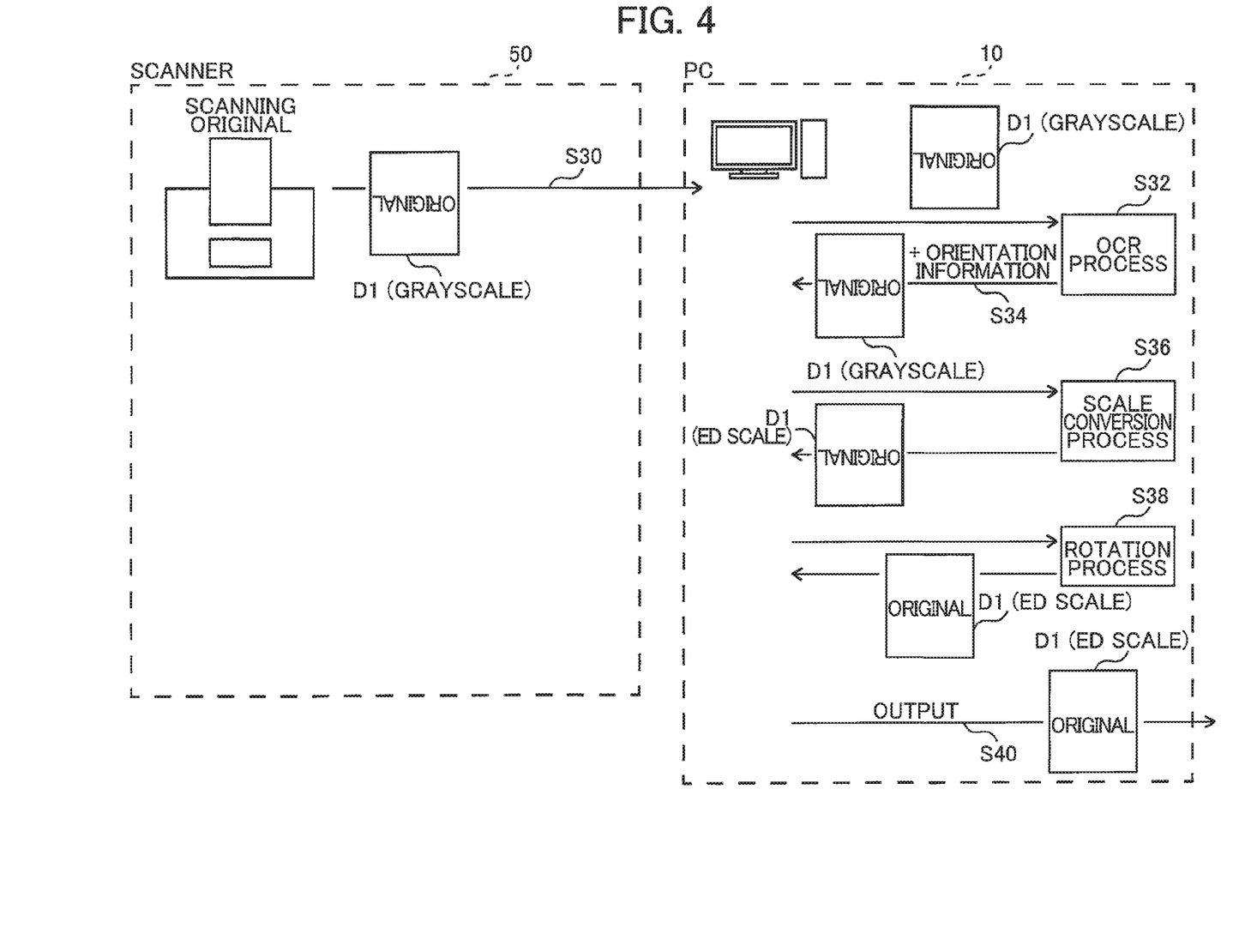
FIG. 4 is an explanatory diagram illustrating a process executed by the scanning system when a scale of color is set to a grayscale according to the first embodiment.

The scanner driver 30 receives the scan data D1 and stores the scan data D1 in the data storage area 34. In S32 the scanner driver 30 performs the OCR process on the scan data D1. The OCR process is performed on the scan data D1 in the grayscale, so the OCR process is suitably performed, and in S34 the scanner driver 30 properly acquires orientation information based on a result of the OCR process.

In this example, the scanner driver 30 sends to the scanner 50 the scan instruction to perform the scan process based on the grayscale to generate the scan data D1 in the grayscale in spite of the ED scale which the user has been set as a scale of color for the scan process. So, in S36 the scanner driver 30 converts the scan data D1 in the grayscale to scan data D1 in the ED scale. As a result, the created scan data D1 is in the ED scale that is the scale of color specified by the user.

In S38 the scanner driver 30 rotates the image in the scan data in the ED scale created in S36 using the orientation information acquired in S34. Accordingly, the scan data D1 representing an image in the right side up state is obtained. In S40 the scanner driver 30 outputs to the application 32 the scan data D1 representing the image in the right side up state. Accordingly, a correctly oriented image can be edited in the application 32. The scan data D1 in the grayscale is converted to the scan data D1 in the ED scale before the image is rotated. Accordingly, the image can be rotated while saving the memory space.

As described above, when the user sets the setting for the scale of color to the ED scale and the setting for the automatic correction process to ON, the scanner driver 30 sends to the scanner 50 the scan instruction to perform the scan process based on the grayscale. Accordingly, the OCR process can be properly performed, thereby performing suitably the automatic correction process. After the OCR process is performed, the scan data D1 in the grayscale is converted to the scan data D1 in the ED scale, thereby providing the scan data desired by the user. Further, the scale conversion process and the rotation process are performed in the proper order, thereby saving the memory space.

As described above, the scanner driver 30 sends to the scanner 50 the scan instruction to perform the scan process based on the grayscale for ensuring proper execution of the OCR process, in spite of the ED scale being set as the setting for the scale of color. However, the scanner driver 30 may send to the scanner 50 a scan instruction to perform a scan process based on the color-scale to create scan data D1 in the color-scale, in order to obtain the same effect. Note that the memory space can be more effectively saved when sending the scan instruction to performs the scan process based on the grayscale than when sending to the scanner 50 the scan instruction to perform the scan process based on the color-scale. In the case where the scanner driver 30 sends to the scanner 50 the scan instruction to perform the scan process based on the color-scale, the scanner driver 30 perform a scale conversion process to convert the scan data in the color-scale to scan data in the ED scale.

When the user sets the setting for the scale of color to the ED scale and the setting for the automatic correction process to ON, the scanner driver 30 sends the scan instruction to perform a scan process based on the grayscale and performs the OCR process. In these processes, the method of control is changed slightly depending on the setting for side of the original to be scanned.

When the setting for side of the original is set to a single-sided scan, the scanner driver 30 performs processing in accordance with the method of control described while referring to FIG. 4. When the setting for side of the original is set to a double-sided scan, the scanner driver 30 sends to the scanner 50 a scan instruction to perform a scan process using the grayscale for one side of the original and a scan instruction to perform a scan process using the ED scale (i.e. the scale set by the user) for the other side of the original. Accordingly, the scanner 50 performs the scan process based on the grayscale for one side of the original, and the scan process based on the ED scale for the other side of the original. So, the scanner 50 creates scan data D1 in the grayscale for one side of the original and scan data D1 in the ED scale for the other side of the original, and sends those sets of scan data D1 to the PC 10.

The scanner driver 30 receives the scan data D1 for one side of the original and the scan data D1 for the other side of the original and stores those sets of scan data in the data storage area 34. The scanner driver 30 performs the OCR process only on the scan data D1 for one side of the original. In other words, the scanner driver 30 performs the OCR process on one set of scan data D1 in the grayscale, but does not perform the OCR process on another set of scan data D1 in the ED scale. Accordingly, the scanner driver 30 acquires orientation information of text included in an image of one side of the original.

Subsequently, the scanner driver 30 converts the scale of color in the scan data D1 for one side of the original to the scale of color in accordance with (matching) settings specified by the user. In other words, the scanner driver 30 performs a scale conversion process to convert the scan data D1 in the grayscale for one side of the original to scan data D1 in the ED scale. The scan data D1 for the other side of the original is in the ED scale in accordance with the setting by the user, so the scale conversion process is not performed thereon.

The scanner driver 30 rotates an image in the scan data D1 for one side of the original using the orientation information acquired on the basis of the scan data D1 for one side of the original, thereby obtaining scan data D1 in the right side up state for one side of the original. The scanner driver 30 rotates an image in the scan data D1 for the other side of the original using the orientation information acquired on the basis of the scan data D1 for one side of the original. This is because when the image represented by the scan data D1 obtained by the scan process for one side of the original is in the up side down state, the image represented by the scan data D1 obtained by the scan process for the other side of the original is also in the up side down state. Accordingly, the scanner driver 30 can obtain the scan data D1 in the right side up state for the other side of the original. The scanner driver 30 outputs to the application 32 the scan data D1 in the right side up state for one side of the original and the scan data D1 in the right side up state for the other side of the original.

As described above, when the setting for side of an original to be scanned is set to a double-sided scan, the scanner driver 30 sends a scan instruction to perform a scan process in the grayscale, which is different from the setting for the scale of color specified by the user, only for one side of the original. Accordingly, the orientation of both sides of an original can be corrected without performing the OCR process and the scale conversion process on the scan data D1 for the other side of the original. This configuration can reduce a processing time and a processing load.

As described above, when the scan data D1 is in any one of the color-scale, the grayscale, or the monochrome scale without the digital halftoning, the OCR process can be properly performed on the scan data D1, and the rotation process can also be properly performed on the scan data D1 using the result of the OCR process. So, when the user sets the setting for the scale of color to a setting other than the ED scale, that is, the color-scale, the grayscale, or the monochrome scale, and the setting for the automatic correction process to ON, the scanner driver 30 sends to the scanner 50 a scan instruction to perform a scan process based on the scale of color in accordance with (matching) the setting by the user in the method explained in FIG. 2. The scanner driver 30 performs the OCR process and the rotation process on the scan data D1. Because the scanner driver 30 sends to the scanner 50 a scan instruction to perform the scan process based on the scale of color in accordance with the setting specified by the user, and thus the scale conversion is not necessary.

When the user sets the setting for the automatic correction process to OFF, the OCR process is not performed. So, the scale of color in the scan data need not be considered. When the setting for the automatic correction process is set to OFF, the scanner driver 30 sends to the scanner 50 a scan instruction to perform a scan process in a scale of color in accordance with (matching) the setting set by the user irrespective of the scale of color set from among scales including the color-scale, the grayscale, and the ED scale. When the scanner driver 30 receives scan data from the scanner 50, the scanner driver 30 can perform conventional processes.

<Process Executed by Scanner Driver>

Figure 5:
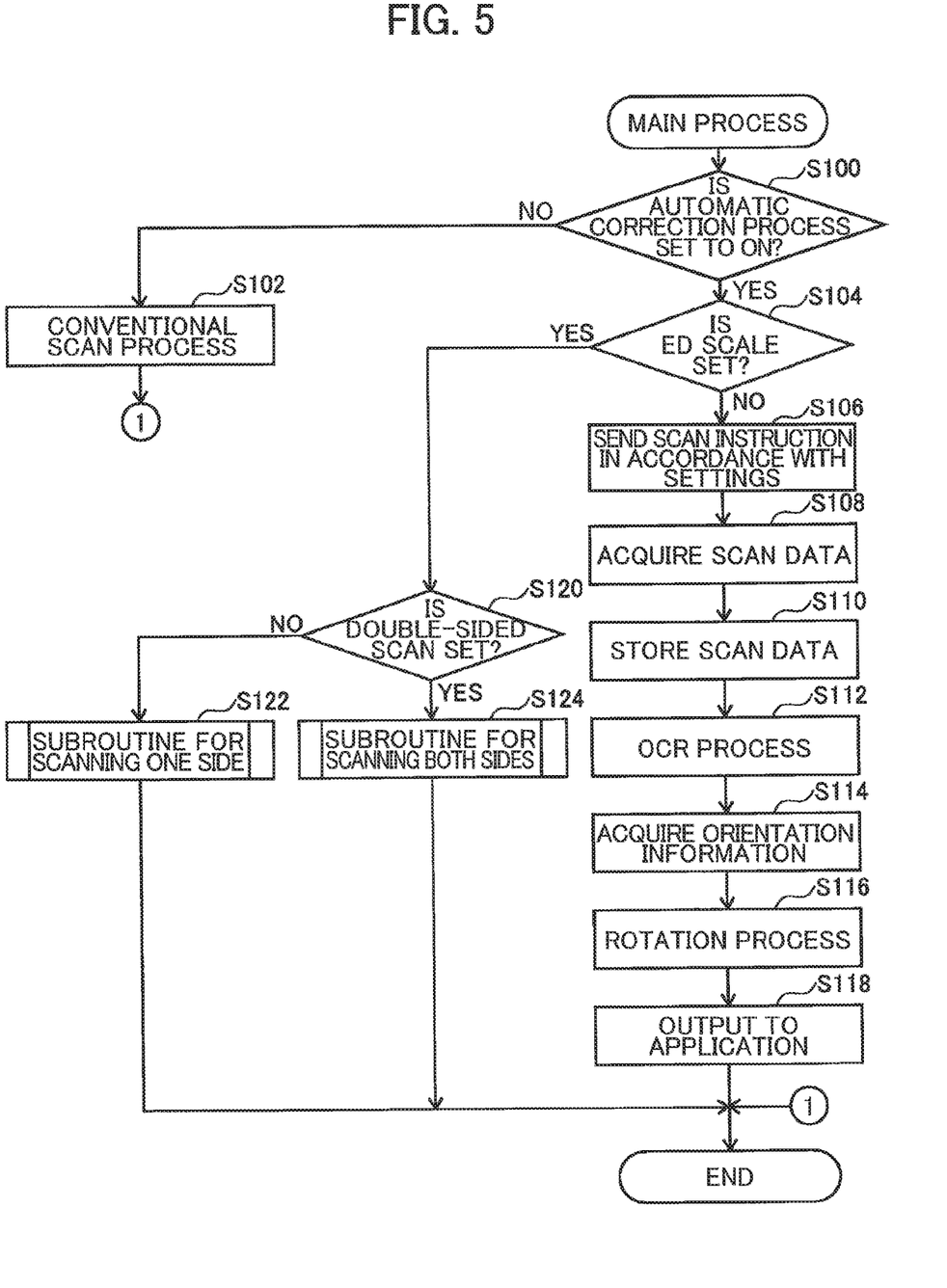
FIG. 5 is a flowchart illustrating a main process of a scanner driver according to the first embodiment.
Figure 6:
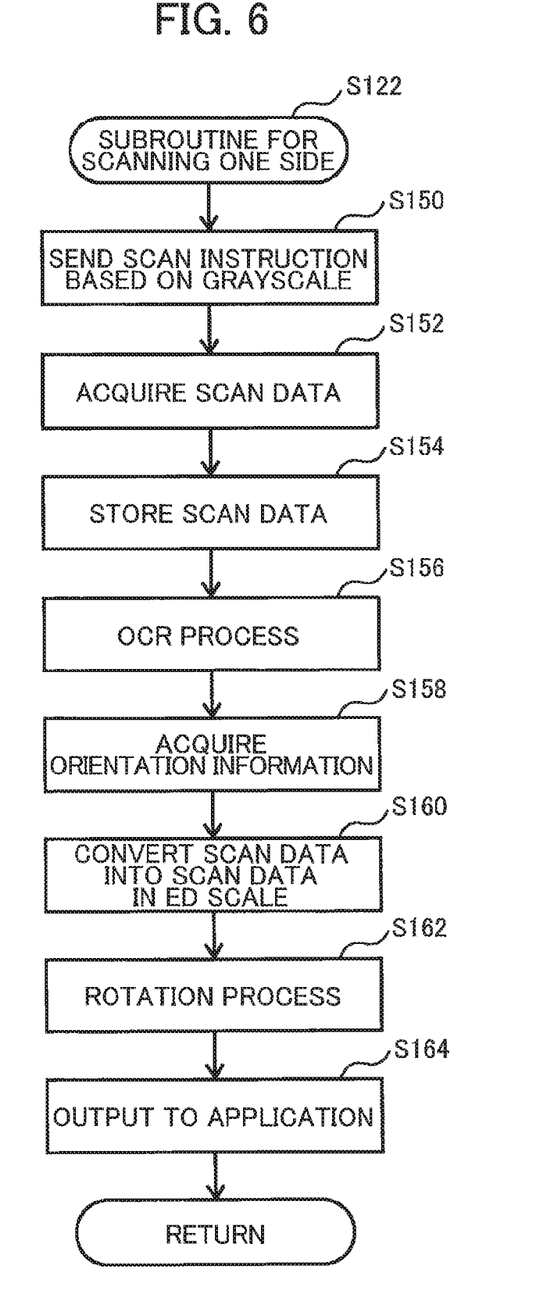
FIG. 6 is a flowchart illustrating a subroutine for scanning one side of the original according to the first embodiment.
Figure 7:
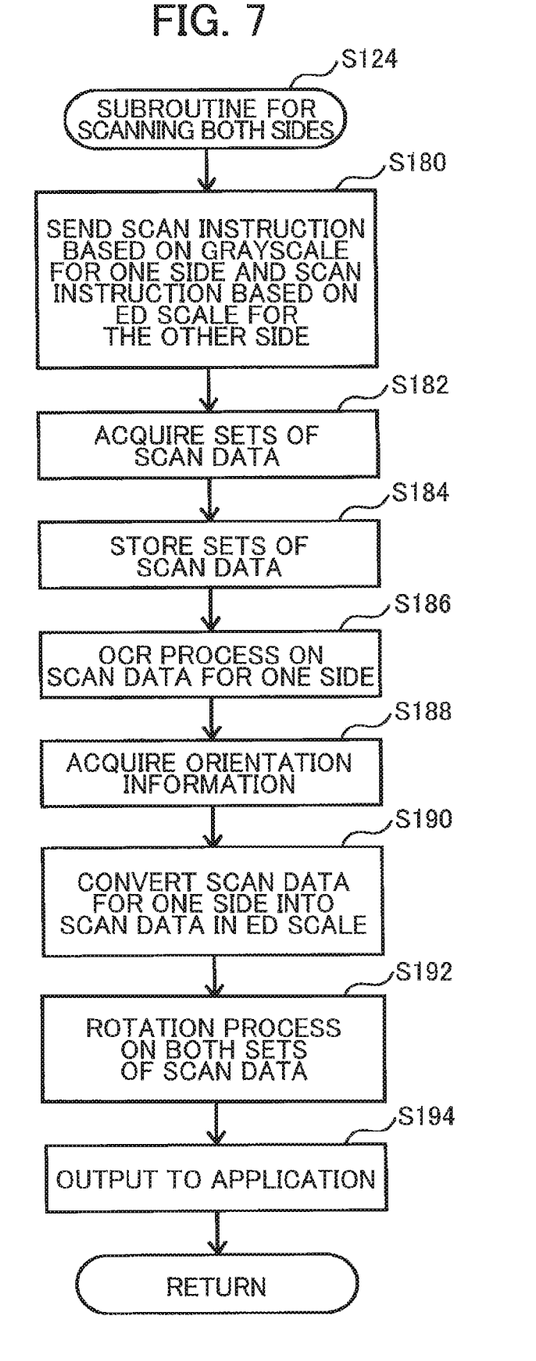
FIG. 7 is a flowchart illustrating a subroutine for scanning both sides of the original according to the first embodiment.

The CPU 12 executing the scanner driver 30 sends the scan instruction to perform the scan process to the scanner 50 from the PC 10, and performs various processes on scan data D1 acquired as a response to the scan instruction. FIGS. 5-7 are flowcharts illustrating a main process executed when the scanner driver 30 is executed. The main process starts, after the scanner driver 30 is activated and user operations for inputting settings for the scan process are performed. The main process is repeatedly performed once the main process starts.

In S100 shown in FIG. 5 the scanner driver 30 determines whether the setting for the automatic correction process is set to ON. When the setting for the automatic correction process is set to OFF (S100: NO), in S102 the conventional scan process is performed without performing the automatic correction process, and then the main process ends. When the setting for the automatic correction process is set to ON (S100: YES), in S104 the scanner driver 30 determines whether the setting for the scale of color is set to the ED scale.

When the setting for the scale of color is not set to the ED scale (S104: NO), in S106 the scanner driver 30 sends to the scanner 50 a scan instruction to perform a scan process in accordance with (matching) the setting for the scale of color. After the scanner 50 scans an original accordance to the scan instruction, in S108 the scanner driver 30 acquires scan data D1 from the scanner 50 and in S110 stores the acquired scan data D1 in the data storage area 34.

In S112 the scanner driver 30 performs the OCR process on the scan data D1 stored in the data storage area 34. In S114 the scanner driver 30 acquires orientation information based on the result of the OCR process. In S116 the scanner driver 30 performs the rotation process to rotate the image in the scan data D1 using the acquired orientation information so that the rotated image is in the right side up state. In S118 the scanner driver 30 outputs the scan data D1 representing the rotated image in the right side up state to the application 32, and the main process ends. In a case where the setting for side of the original is set to a double-sided scan, the processes S112 and S114 may be performed for scan data D1 for one side of the original, and the rotation process in S114 may be performed on both the sets of scan data for one side of the original and the other side of the original on the basis of the orientation information obtained in S114 by using the scan data D1 for one side of the original.

When the setting for the scale of color is set to the ED scale (S104:YES) in S120 the scanner driver 30 determines whether the setting for side of the original to be scanned is set to a double-sided scan (or a single-sided scan). When the setting for side of the original is set to single-sided scan (S120: NO), the scanner driver 30 proceeds to a subroutine for scanning one side of the original.

In the subroutine for scanning one side of the original, in S150 (FIG. 6) the scanner driver 30 sends to the scanner 50 a scan instruction to perform a scan process based on the grayscale. After the scanner 50 scans the original according to the scan instruction, in S152 the scanner driver 30 acquires scan data D1 in the grayscale from the scanner 50 and in S154 stores the acquired scan data D1 in the data storage area 34.

In S156 the scanner driver 30 performs the OCR process on the scan data D1 stored in the data storage area 34. In S158 the scanner driver 30 acquires orientation information based on the result of the OCR process. In S160 the scanner driver 30 converts the scan data D1 in the grayscale to scan data D1 in the ED scale. In S162 the scanner driver 30 performs the rotation process to rotate the image in the converted scan data D1 using the orientation information so that the rotated image is in the right side up state. In S164 the scanner driver 30 outputs the scan data D1 representing a rotated image in the right side up state to the application 32. Accordingly, the subroutine for scanning one side of the original ends, and the main process also ends.

When the setting for side of an original to be scanned is set to a double-sided scan (S120: YES) (FIG. 5), in S124 a subroutine for scanning both sides of the original is executed. In the subroutine for scanning both sides of the original, in S180 (FIG. 7) the scanner driver 30 sends to the scanner 50 a scan instruction to perform a scan process based on the grayscale for one side of an original and a scan instruction to perform a scan process based on the ED scale for the other side of the original. After the scanner 50 scans the original according to the scan instructions, in S182 the scanner driver 30 acquires from the scanner 50 a set of scan data D1 in the grayscale for one side of the original and a set of scan data in the ED scale for the other side of the original, and in S184 stores the sets of acquired scan data D1 in the data storage area 34.

In S186 the scanner driver 30 performs the OCR process on the scan data D1 in the grayscale for one side of an original. In S188 the scanner driver 30 acquires orientation information based on the result of the OCR process. In S190 the scanner driver 30 converts the scan data D1 in the grayscale for one side of the original to scan data D1 in the ED scale. Using the orientation information, in S192 the scanner driver 30 performs the rotation process to rotate, so that rotated images are in the right side up state, the image in the converted scan data D1 for one side of the original and the image in the scan data D1 for the other side of the original. In S194 the scanner driver 30 outputs to the application 32 the scan data D1 representing a rotated image in the right side up state for one side of the original and the scan data D1 representing a rotated image in the right side up state for the other side of the original. Thereafter, the subroutine for scanning both sides of the original ends, and the main process also ends.

Second Embodiment

In the scanning system 1 according to the first embodiment, the scan instruction to perform the scan process based on the grayscale is transmitted to the scanner 50 in spite of the ED scale being set in the setting for the scale of color, for fear that the OCR process should be failed on scan data in the ED scale. There is also concern that the OCR process may be failed on scan data at a low resolution. This is because the scan data at the low resolution has few pixels per unit area, the image has few details, and thus it is difficult to recognize text included in the image. In a scanning system 1 according to the second embodiment, a scan instruction to perform a scan process based on a high resolution is transmitted to the scanner 50 in spite of a low resolution being set in the setting. This is for fear that the OCR process should be failed on scan data having a low resolution image.

When the user sets a resolution below a prescribed resolution A and the setting for the automatic correction process to ON, the scanner driver 30 sends an instruction to the scanner 50 to perform a scan process to scan an original at resolution B higher than or equal to prescribed resolution A. Accordingly, the scanner 50 performs the scan process based on the resolution B for the original, and sends scan data D1 having the resolution B to the PC 10.

The scanner driver 30 receives the scan data D1 and stores the scan data D1 in the data storage area 34. The scanner driver 30 performs the OCR process on the scan data D1. Since the resolution B of the scan data D1 is higher than the prescribed resolution A, the OCR process can be suitably performed. Accordingly, the scanner driver 30 properly acquires orientation information based on the result of the OCR process.

In a main process, the scanner driver 30 sends to the scanner 50 a scan instruction to perform a scan process based on the resolution B for an original, in spite of a user set resolution which is lower than the resolution A. Accordingly, the scan data D1 at the resolution B is created. The scanner driver 30 performs a resolution conversion process to convert the scan data D1 at resolution B to scan data D1 at a resolution specified by the user's operation. Accordingly, the scan data D1 is generated at the resolution specified by the user.

The scanner driver 30 performs the rotation process to rotate an image in the converted scan data D1 at the resolution specified by the user using the orientation information acquired in the OCR process. Accordingly, the scanner driver 30 can obtain the scan data D1 having an image in the right side up state. The scanner driver 30 outputs to the application 32 the scan data D1 having the image in the right side up state. As described above, when the user sets the resolution below the prescribed resolution A and the setting for the automatic correction process to ON, the scanner driver 30 sends to the scanner 50 a scan instruction to perform the scan process at the resolution B for the original. Accordingly, the OCR process can be surely performed, and an automatic correction process can be properly performed. After the OCR is performed, the scan data D1 at the resolution B is converted to the scan data D1 at the resolution specified by the user, thereby providing the scan data D1 at the resolution desired by the user.

As described above, when the user sets the resolution below the prescribed resolution A and the setting for the automatic correction process to ON, the scanner driver 30 sends a scan instruction to perform a scan process based on the resolution B for an original, and performs the OCR process. In these processes, the method of control is changed slightly depending on the setting for side of an original to be scanned.

When the setting for side of an original to be scanned is set to a single-sided scan, the scanner driver 30 performs the control in accordance with the method described above. When the setting for side of an original to scan is set to a double-sided scan, the scanner driver 30 sends to the scanner 50 a scan instruction to perform a scan process based on the resolution B for one side of an original, and a scan instruction to perform a scan process based on a resolution in accordance with (matching) settings by the user for the other side of the original. Accordingly, the scanner 50 performs the scan process based on the resolution B for one side of the original to create scan data D1 at the resolution B, and scan process based on the resolution below the resolution A (the resolution set by the user) to create scan data D1 at the resolution A. The scanner 50 creates a set of scan data D1 at the resolution B for one side of the original and a set of scan data D1 at the resolution below the prescribed resolution A for the other side of the original, and sends the two sets of scan data to the PC 10.

The scanner driver 30 receives the set of scan data D1 for one side of an original and the set of scan data D1 for the other side of the original and stores the sets of scan data in the data storage area 34. The scanner driver 30 performs the OCR process only on the set of scan data for one side of the original. In other words, the scanner driver 30 performs the OCR process on the set of scan data D1 at the resolution B, but does not perform the OCR process on the set of scan data D1 at the resolution below the prescribed resolution A. Accordingly, the scanner driver 30 acquires orientation information for text included in an image of one side of the original.

Subsequently, the scanner driver 30 converts the resolution of the scan data D1 for one side of the original to a resolution in accordance with (matching) the setting set by the user. The scanner driver 30 performs the rotation process to rotate an image in the scan data D1 for one side of the original, using the acquired orientation information of the scan data D1 for one side of the original. Accordingly, the scanner driver 30 can obtain the scan data D1 having an image in the right side up state for one side of the original. The scanner driver 30 also performs the rotation process to rotate an image in the scan data D1 for the other side of the original, using the acquired orientation information of the scan data D1 for one side of the original. Accordingly, the scanner driver 30 can obtain the scan data D1 having an image in the right side up state for the other side of the original. The scanner driver 30 outputs to the application 32 the scan data D1 having the image in the right side up state for one side of an original and the scan data D1 having the image in the right side up state for the other side of the original.

As described above, when the setting for side of the original to be scanned is set to the double-sided scan, the scanner driver 30 send a scan instruction to perform the scan process at a resolution different from the resolution set by the user for one side of the original. Accordingly, the orientations of images for both sides of the original may be properly corrected without performing the OCR process and the resolution conversion process on the scan data D1 for the other side of the original. This configuration can reduce the processing time and the processing load.

When the scan data D1 has a resolution higher than or equal to the prescribed resolution A, the OCR process can be suitably performed on the scan data D1, and the rotation process can also be properly performed on the scan data D1 using the result of the OCR process. So, when the user sets the resolution higher than or equal to the prescribed resolution A and the setting for the automatic correction process to ON, the scanner driver 30 sends to the scanner 50 a scan instruction to perform a scan process based on the resolution in accordance with (matching) the user setting for an original. The scanner driver 30 performs the OCR process and the rotation process. Because the scanner driver 30 sends to the scanner 50 the scan instruction to perform the scan process based on the resolution in accordance with the user setting for the original, the resolution conversion process is not necessary.

Figure 8:
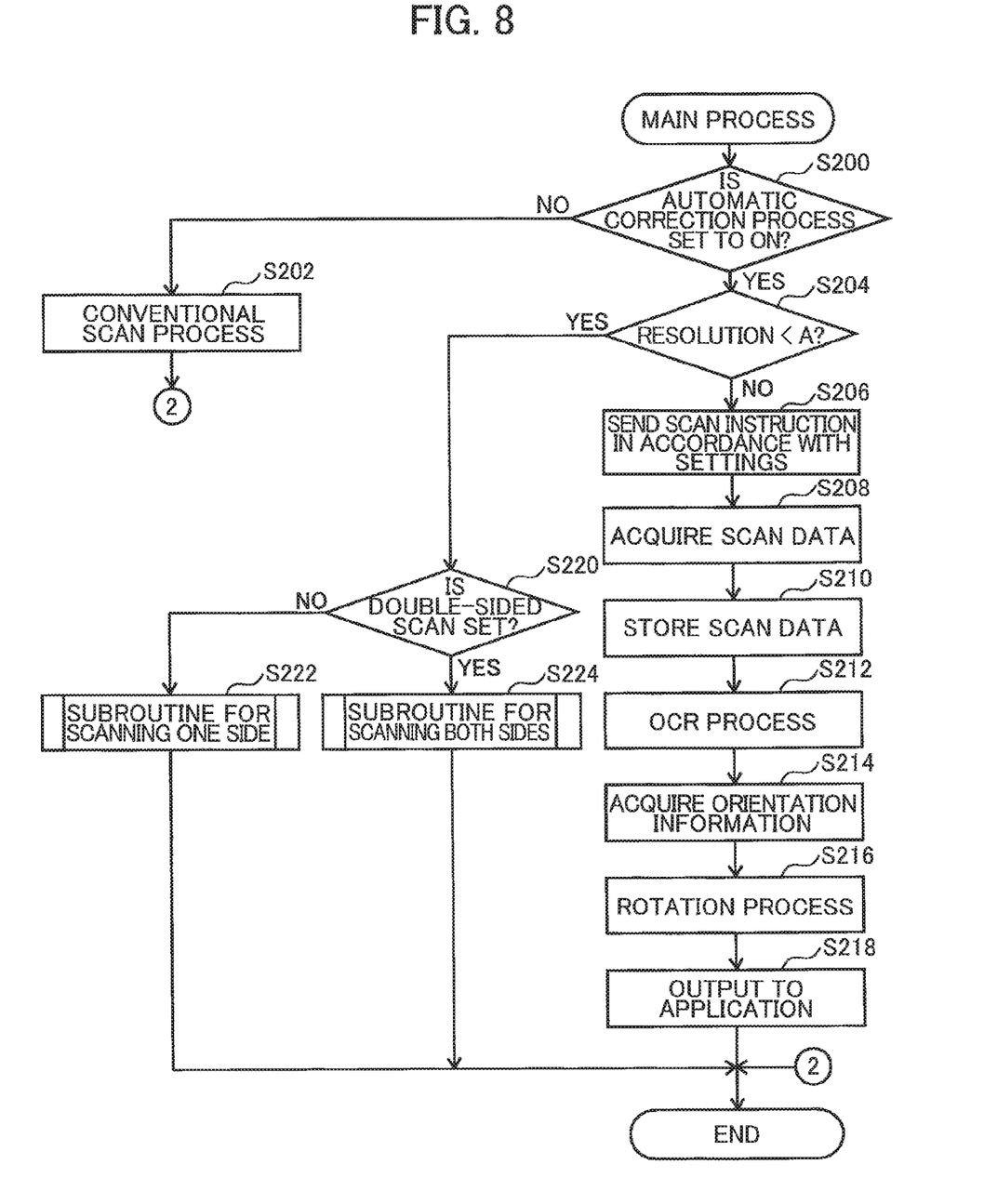
FIG. 8 is a flowchart illustrating a main process of a scanner driver according to a second embodiment.
Figure 9:
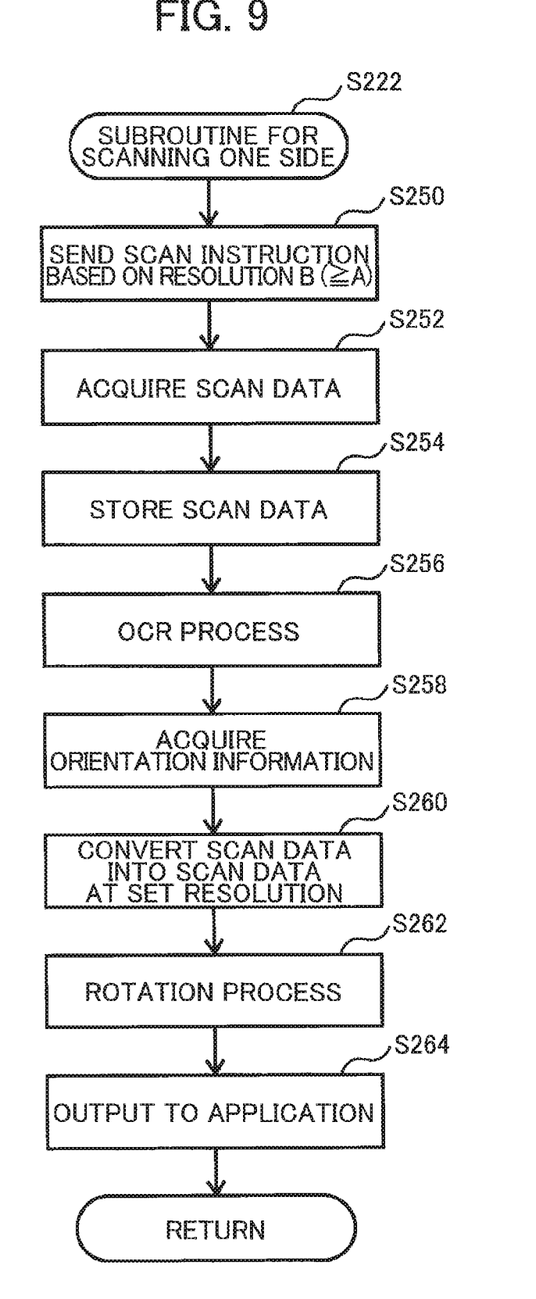
FIG. 9 is a flowchart illustrating a subroutine for scanning one side of the original according to the second embodiment.
Figure 10:
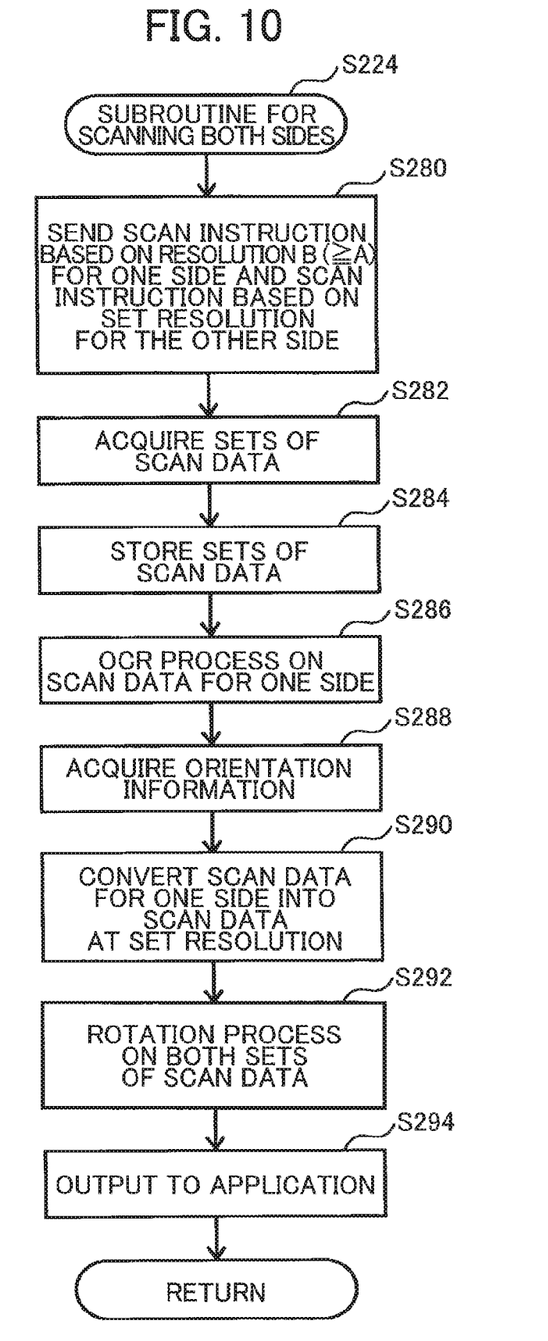
FIG. 10 is a flowchart illustrating a subroutine for scanning both sides of the original according to the second embodiment.

When the CPU 12 executes the scanner driver 30, the scan process according to the second embodiment is performed. FIGS. 8-10 are flowchart illustrating a main process executed when the scanner driver 30 are performed.

In S200 of FIG. 8 the scanner driver 30 determines whether the setting for the automatic correction process is set to ON. When the setting for the automatic correction process is set to OFF (S200: NO), in S200 the conventional scan process is performed without performing the automatic correction process. Then, the scanner driver 30 ends the main process. When the setting for the automatic correction process is set to ON (S200: YES), in S204 the scanner driver 30 determines whether the set resolution set by the user is below the prescribed resolution A.

When the set resolution is higher than or equal to the prescribed resolution A (S204: NO), in S206 the scanner driver 30 sends to the scanner 50 a scan instruction to scan the original at the resolution in accordance with (matching) the user setting. The scanner 50 performs the scan process for the original according to the scan instruction, and in S208 the scanner driver 30 acquires scan data D1 from the scanner 50 and in S210 stores the acquired scan data D1 in the data storage area 34.

In S212 the scanner driver 30 performs the OCR process on the scan data D1 stored in the data storage area 34. In S214 the scanner driver 30 acquires orientation information based on the result of the OCR process. In S216 the scanner driver 30 performs the rotation process to rotate an image in the scan data D1 using the acquired orientation information. In S218 the scanner driver 30 outputs the scan data D1 having the rotated image in the right side up state to the application 32. Accordingly, the scanner driver 30 ends the main process. In a case where the setting for side of the original is set to a double-sided scan, the processes S212 and S214 may be performed for scan data D1 for one side of the original, and the rotation process in S214 may be performed on both the sets of scan data for one side of the original and the other side of the original on the basis of the orientation information obtained in S214 by using the scan data D1 for one side of the original.

When the resolution higher than or equal to the prescribed resolution A is set (S204: YES) in S204, in S220 the scanner driver 30 determines whether the setting for side of the original to be scanned is set to a double-sided scan (or, a single-sided scan). When the setting for side of the original is set to a single-sided scan (S220: NO), in S222 the scanner driver performs a subroutine for scanning one side of the original.

In the subroutine for scanning one side of the original, in S250 of FIG. 9 the scanner driver 30 sends to the scanner 50 a scan instruction to perform a scan process based on the resolution B for the original. The scanner 50 performs the scan process according to the scan instruction for the original, and in S252 the scanner driver 30 acquires scan data D1 at the resolution B from the scanner 50, and in S254 stores the acquired scan data at the resolution B in the data storage area 34.

In S256 the scanner driver 30 performs the OCR process on the scan data D1 at the resolution B stored in the data storage area 34. In S258 the scanner driver 30 acquires orientation information based on the result of the OCR process. In S260 the scanner driver 30 converts the scan data D1 at resolution B to scan data D1 at a resolution in accordance with (matching) settings by the user. In S262 the scanner driver 30 performs the rotation process to rotate the image in the scan data D1 so that the rotated image is in the right up state using the orientation information. In S264 the scanner driver 30 outputs image-rotated scan data in the right side up state to the application 32. Accordingly, the scanner driver 30 ends the subroutine for scanning one side of the original ends, and also ends the main process.

When the setting for side of an original to be scanned is set to a double-sided scan (S220:YES) (FIG. 8), in S224 the scanner driver 30 performs a subroutine for scanning both sides of the original. In the subroutine for scanning both sides of the original, in S280 shown in FIG. 10 the scanner driver 30 sends to the scanner 50 a scan instruction to perform the scan process based on the resolution B for one side of the original, and a scan instruction to perform the scan process based on the resolution in accordance with (matching) the user setting for the other side of the original. The scanner driver 30 performs the scan processes according to the scan instructions, and in S282 the scanner driver 30 acquires from the scanner 50 a set of scan data D1 at the resolution B for one side of the original and a set of scan data at the resolution in accordance with the user setting for the other side of the original, and in S284 stores the two sets of acquired scan data in the data storage area 34.

In S286 the scanner driver 30 performs the OCR process on the scan data D1 at the resolution B for one side of an original. In S288 the scanner driver 30 acquires orientation information based on the result of the OCR process. In S290 the scanner driver 30 converts the scan data at resolution B for one side of the original to scan data D1 at a resolution in accordance with the user setting. In S292 the scanner driver 30 performs the rotation process on the two sets of scan data for one side of the original and the other side of the original rotation using the orientation information so that rotated images are in the right side up state. In S294 the scanner driver 30 outputs to the application 32 the set of scan data D1 having the rotated image in the right side up state for one side of the original and the set of scan data D1 having the rotated image in the right side up state for the other side of the original. Accordingly, the scanner driver 30 ends the subroutine for scanning both sides of the original ends, and also ends the main process.

The CPU 12 executing S106 is an example of the outputting a second scan instruction. The CPU 12 executing S112 is an example of the executing the character recognition on the setting-based scan data. The CPU 12 executing S116 is an example of the executing the prescribed process on the setting-based scan data. The CPU 12 executing S154 and S184 is an example of the storing the multiple-value scan data or the setting-based scan data. The CPU 12 executing S118, S164, and S194 is an example of the outputting the first executed scan data or the outputting the second executed scan data. The CPU 12 executing S156 and S186 is an example of the executing the character recognition process on the multiple-value scan data. The CPU 12 executing S158 is an example of the acquiring first orientation information. The CPU 12 executing S158 is an example of the acquiring second orientation information. The CPU 12 executing S160 and S190 is an example of the executing a convert process. The CPU 12 executing S162 and S192 is an example of the executing the prescribed process on the setting-based scan data. The CPU 12 executing S206 is an example of the outputting a second scan instruction. The CPU 12 executing S212 is an example of the executing the character recognition process on the setting-based scan data. The CPU 12 executing S216 is an example of the executing the prescribed process on the setting-based scan data. The CPU 12 executing S254 and S284 is an example of the storing the multiple-value scan and the setting-based scan data. The CPU 12 executing S218, S264, and S294 is an example of the outputting the first executed scan data or the outputting the second executed scan data. The CPU 12 executing S256 and S286 is an example of the executing the character recognition process on the multiple-value scan data and the executing the character recognition process on the setting-based scan data. The CPU 12 executing S258 is an example of the acquiring first orientation information. The CPU 12 executing S288 is an example of the acquiring second orientation information. The CPU 12 executing S260 and S290 is an example of the executing a convert process. The CPU 12 executing S262 and S29 is an example of executing the prescribed process on the converted scan data.

While the disclosure has been described in detail with reference to the above embodiments, it would be apparent to those skilled in the art that various changes and modifications may be made thereto. For example, the PC 10 receives settings for scanning and the PC 10 outputs a scan instruction to the scanner 50 in the embodiments. However, the scanner 50 may receive settings for scanning, generate a scan instruction similarly to the embodiments, and, perform a scan process for an original according to the scan instruction generated in the scanner 50.

In the embodiments, the CPU 12 executes the processes shown in FIGS. 5-10. However, instead of the CPU 12, other logic integrated circuit such as an ASIC may performs the processes. Alternatively, the CPU 12 may perform the processes in conjunction with other logic integrated circuit such as an ASIC.

At least one of processes or steps in the first embodiment may be combined with at least one of processes of steps in the second embodiment.

What is claimed is:

1. A non-transitory computer readable storage medium storing a set of program instructions for an image processing apparatus including a controller, an operation interface, and a memory, the set of program instructions comprising:

receiving setting values for a scan process via the operation interface;

in a first case where the setting values indicate to create scan data representing an image by using digital halftoning to represent gradations and indicate to require execution of a prescribed process using a result of a character recognition process:

outputting a first scan instruction instructing a scanner device to scan an original to create multiple-value scan data which represents gradation by a method different from the digital halftoning that is indicated by the received setting value, the multiple-value scan data having a plurality of pixel values, each of the plurality of pixel values being represented by two or more bits for representing color according to the method;

acquiring from the scanning device the multiple-value scan data which is created by the scanning device as a response to the first instruction;

storing the acquired multiple-value scan data;

executing the character recognition process on the multiple-value scan data;

after the character recognition process is performed, executing a convert process to convert the multiple-value scan data into converted scan data representing gradations in the image by using digital halftoning which is indicated by the received setting value;

executing the prescribed process on the converted scan data to generate first executed scan data by using the result of the character recognition process; and outputting the first executed scan data; and in a second case where the setting values indicate to create scan data representing an image by using a method different from the digital halftoning to represent gradations, and indicate to require execution of the prescribed process:
    outputting a second scan instruction instructing the scanner device to scan the original to create setting-based scan data matching the setting values;
    acquiring from the scanning device the setting-based scan data which is created by the scanning device as a response to the second instruction;
    storing the acquired setting-based scan data;
    executing the character recognition process on the setting-based scan data;
    executing the prescribed process on the setting-based scan data to generate second executed scan data by using the result of the character recognition process; and
    outputting the second executed scan data.

2. The non-transitory computer readable storage medium according to claim 1, wherein the first scan instruction instructs to create, as the multiple-value scan data, scan data representing the gradations in a grayscale.

3. The non-transitory computer readable storage medium according to claim 1, wherein the set of program instructions comprises:
    acquiring first orientation information as a result of the character recognition process on the multiple-value scan data, the first orientation information indicating orientation of text in an image represented by the multiple-value scan data; and
    acquiring second orientation information as a result of the character recognition process on the setting-based scan data, the second orientation information indicating orientation of text in an image represented by the setting-based scan data,
    wherein the prescribed process on the converted scan data is a rotation process to rotate an image represented by the converted scan data on a basis of the first orientation information,
    wherein the prescribed process on the setting-based scan data is a rotation process to rotate an image represented by the setting-based scan data on a basis of the second orientation information.

4. The non-transitory computer readable storage medium according to claim 3, wherein in the first case, the setting values further indicates execution of scanning for both sides of an original, and the first scan instruction further includes a first instruction to create multiple value scan data for one side of the original and a second instruction to create setting-based scan data matching the setting values for the other side of the original, the multiple value scan data for one side of the original including a plurality of pixel values, each of the plurality of pixel values being represented by two or more bits for representing color,
    wherein in the first case, the character recognition process is executed on the multiple value scan data for one side of the original to acquire the first orientation information, and the convert process is executed on the multiple value scan data for one side of the original to create converted scan data representing gradations by using the digital halftoning for the one side of the original,
    wherein in the first case, the rotation process is performed on both the converted scan data for one side of the original and the setting-based scan data for the other side of the original on a basis of the first orientation information.

5. An image processing apparatus comprising:
an operation interface;
a memory; and
a controller configured to perform:
    receiving setting values for a scan process via the operation interface;
    in a first case where the setting values indicate to create scan data representing an image by using digital halftoning to represent gradations and indicate to require execution of a prescribed process using a result of a character recognition process:
        outputting a first scan instruction instructing a scanner device to scan an original to create multiple-value scan data which represents gradation by a method different from the digital halftoning that is indicated by the received setting value e multiple-value scan data having a plurality of pixel values, each of the plurality of pixel values being represented by two or more bits for representing color according to the method;
        acquiring from the scanning device the multiple-value scan data which is created by the scanning device as a response to the first instruction;
        storing the acquired multiple-value scan data;
        executing the character recognition process on the multiple-value scan data;
        after the character recognition process is performed, executing a convert process to convert the multiple-value scan data into converted scan data representing gradations in the image by using digital halftoning which is indicated by the received setting value;
        executing the prescribed process on the converted scan data to generate first executed scan data by using the result of the character recognition process; and
        outputting the first executed scan data; and
    in a second case where the setting values indicate to create scan data representing an image by using a method different from the digital halftoning to represent gradations, and indicate to require execution of the prescribed process:
        outputting a second scan instruction instructing the scanner device to scan the original to create setting-based scan data matching the setting values;
        acquiring from the scanning device the setting-based scan data which is created by the scanning device as a response to the second instruction;
        storing the acquired setting-based scan data;
        executing the character recognition process on the setting-based scan data;
        executing the prescribed process on the setting-based scan data to generate second executed scan data by using the result of the character recognition process; and
        outputting the second executed scan data.

* * * * *

UNITED STATES PATENT AND TRADEMARK OFFICE
CERTIFICATE OF CORRECTION

PATENT NO. : 10,805,481 B2
APPLICATION NO. : 16/261964
DATED : October 13, 2020
INVENTOR(S) : Kenju Narita et al.

Page 1 of 1

It is certified that error appears in the above-identified patent and that said Letters Patent is hereby corrected as shown below:

In the Claims

Column 18, Claim 5, Line 21 should read:
indicated by the received setting value, the multiple- Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*